United States Patent [19]
Klosterman et al.

[11] Patent Number: 5,938,206
[45] Date of Patent: *Aug. 17, 1999

[54] PRESSURE RESPONSIVE PRIMARY RING FOR A NON-CONTACTING MECHANICAL END FACE SEAL

[75] Inventors: Gregory E. Klosterman, Arlington Heights; Wei Tang Lai, Hoffman Estates; James R. Wasser, Gurnee, all of Ill.

[73] Assignee: John Crane Inc., Morton Grove, Ill.

[ * ] Notice: This patent is subject to a terminal disclaimer.

[21] Appl. No.: 08/889,252

[22] Filed: Jul. 10, 1997

Related U.S. Application Data

[63] Continuation-in-part of application No. 08/743,012, Nov. 1, 1996, Pat. No. 5,681,047.

[51] Int. Cl.⁶ .............................. F16J 15/34; F16J 15/40
[52] U.S. Cl. ..................... 277/399; 277/400; 277/358; 277/408
[58] Field of Search ..................... 277/400, 358, 277/399, 408

[56] References Cited

U.S. PATENT DOCUMENTS

| | | | |
|---|---|---|---|
| 3,499,653 | 3/1970 | Gardner | 277/400 X |
| 3,804,424 | 4/1974 | Gardner | 277/360 |
| 3,905,606 | 9/1975 | Florjancic | 277/399 X |
| 4,212,475 | 7/1980 | Sedy | 277/360 |
| 4,290,611 | 9/1981 | Sedy | 277/366 |
| 4,407,512 | 10/1983 | Trytek | 277/400 |
| 4,643,437 | 2/1987 | Salant et al. | 277/399 X |
| 4,691,927 | 9/1987 | Sudol et al. | 277/360 |
| 4,792,146 | 12/1988 | Lebeck et al. | 277/399 X |
| 4,884,945 | 12/1989 | Boutin et al. | 277/400 X |
| 5,121,931 | 6/1992 | Matsushita et al. | 277/400 |
| 5,135,235 | 8/1992 | Parmar | 277/399 X |
| 5,143,384 | 9/1992 | Lipschitz | 277/400 |
| 5,375,853 | 12/1994 | Wasser et al. | 277/400 X |
| 5,421,593 | 6/1995 | Aritsubo et al. | 277/361 |
| 5,468,002 | 11/1995 | Wasser | 277/399 X |
| 5,609,342 | 3/1997 | Peterson et al. | 277/399 |
| 5,681,047 | 10/1997 | Klostermann et al. | |

FOREIGN PATENT DOCUMENTS 1555765  11/1979  United Kingdom .

OTHER PUBLICATIONS

Karl Schoenner; "Fundamentals of Mechanical End Face Seals" *Engineered Fluid Sealing*, Crane Packing Company, pp. 85 91; 1979.

Lebeck, A.O. "A Mixed Friction Hydrostatic Mechanical Face Seal Model with Thermal Rotation and Wear," *ASLE Transactions*; vol. 23, No. 1, pp. 375–387 (date unknown).

"Principles and Design of Mechanical Face Seals," A.O. Lebeck, John Wiley and Sons Co., Inc. New York, NY, 1991, pp. 653–663.

*Primary Examiner*—Anthony Knight
*Assistant Examiner*—William Ackerman
*Attorney, Agent, or Firm*—Dorn, McEachran, Jambor & Keating

[57] ABSTRACT

A mechanical end face seal of the non-contacting type includes a primary seal ring having a back section, a seal face section and a middle section between the seal face and the back sections, each primary ring section having a radial dimension, defined as the difference between the outermost radius and the innermost radius of said respective section, the radial dimension of the back section being in a ratio relative to said middle section of between about 1.5 to about 3.1, and more preferably of between about 1.9 to about 2.5, and most preferably about 2.0 to about 2.3. Additionally, the mating seal ring includes grooves extending from one seal ring circumference toward the other and terminating adjacent a dam at a radius $R_g$, it is beneficial to have the boundary between the grooves and the dam have a radius $R_g$ slightly larger or smaller, within about 10%, than the outer radius of the middle section.

6 Claims, 3 Drawing Sheets

PRESSURE RESPONSIVE PRIMARY RING FOR A NON-CONTACTING MECHANICAL END FACE SEAL

CROSS REFERENCE TO RELATED APPLICATION

This is a continuation-in-part of U.S. patent application Ser. No. 08/743,012, filed on Nov. 1, 1996, now U.S. Pat. No. 5,681,047 issued Oct. 28, 1997.

BACKGROUND OF THE INVENTION

1. Field of the Invention

This invention relates generally to non-contacting end face seals and more specifically to seals which can accommodate high pressure differentials between the outer and inner diameters of such seals.

2. Background Art

Mechanical end face seals of the non-contacting type have become high technology items utilizable in a variety of industries. These type of seals are designed with a great deal of care and attention to the materials, shapes, dimensions and tolerances of the component parts. Such attention to detail in the design is necessary in order to accommodate a great number of characteristics, any of which characteristics is liable to affect the efficiency or operation of seals of this type. Minor changes or alterations to any one of about 10 physical features of a seal, its components or its sealing environment may, and in most cases will, result in a change in the seals characteristics, sealing capability, wear, endurance and/or integrity. In most cases, it is desirable for the seals of this type to operate maintenance and trouble free for extensive periods of time, on the order of years. The seals are used in machinery which cannot be shut down for long without severely impairing the operation and efficiency of, for example, a large chemical plant or refinery.

Seals of this type may at times be utilized in dual or double seals, the two seals being spaced apart axially along a shaft passing through an aperture in a housing. Double seals generally also include a buffer fluid in the intermediate chamber defined by the housing and enclosed by the two seals. Various arrangements of double seals are described in commonly owned U.S. Pat. Nos. 4,290,611 and 5,375,853, both of which are hereby incorporated by reference.

U.S. Pat. No. 5,375,853 in particular illustrates and describes a dual non-contacting type seal having a relatively inert gas, such as nitrogen, as the buffer fluid at a high pressure in excess of the pressure of the sealed liquid within the housing.

It has been found that seals of the type described and illustrated in U.S. Pat. No. 5,375,853 operate well under most conditions. However, because the seal arrangements made in accordance with U.S. Pat. No. 5,375,853 were developed for specific pressure conditions, limitations arise in the event the process fluid or buffer gas pressures increase beyond the rated specification pressures of the seal. Keeping other factors the same, seals which are subjected to pressure differentials of over 200 psi between the inner and outer diameters of the seal rings encounters complications which affect the sealing capability. It has been noted that at pressure differentials exceeding 200–250 psi, there is noticeable angular rotation of the seal rings, when viewed in cross-section, around a point known as a centroid. Although the rotation is in fact more of an alteration of the seal ring shape from cylindrical to a conical configuration, the phenomenon is more easily considered as the seal rings are illustrated in cross-section, with the ring cross-section in effect actually being indicated as rotating about its centroid. For ease in illustration and description herein, this convention will be adhered to in the following description and illustrations.

It has been recognized that uneven heating may result in thermal distortion of a seal ring and that high pressure differentials between the inboard and outboard diameters of the seal rings may result in pressure distortions. Such distortions are undesirable because they cause the normally flat opposed mating seal faces of the rings to diverge from the normal sealing engagement between the seal ring faces. In a non-contacting seal, distortion of the seal rings normally causes the outer diameters of each seal ring face to rotate about the centroid toward the centerline of the seal ring, causing the seal gap to become wider at the inner diameter of the seal ring interface and to narrow at the outer diameter. This distortion in and change in axial depth of the seal ring gap is not conducive to sealing capability, because the effects of the spiral grooves pumping a gas against a dam are dissipated if the dam is not adjacent the opposed mating sealing face. The narrowing of the gap at the outer diameter is undesirable for a non-contacting seal because a smaller gap renders the seal faces susceptible to undesirable contact, resulting in premature wear of the seal faces.

One major benefit of non-contact seals is that seal ring wear is essentially kept to a minimum, occurring ideally only during start up or shut down of shaft rotation. Contact is also undesirable because frictional heat resulting from such contact causes uneven heat distribution in the seal rings, and thus in thermal distortion of the rings. To avoid excessive contact at the outer diameters of the seal interface, the primary seal ring of seals made according to U.S. Pat. No. 5,375,853 may include a shoulder at the outer diameter. Another method of avoiding seal contact at the outer diameter of a seal is described in commonly assigned U.S. Pat. No. 3,499,653, which utilizes a convex face of the primary seal ring.

Commonly assigned U.S. Pat. No. 4,407,512 describes a seal construction in which specific parameters of the seal, such as aspect ratio, semi-circular shallow recesses (hydropads) at the radially outer portion of the seal face and a net negative moment about the centroid when the seal is in operation, are used to accommodate high pressure at the outer diameter of the seal. However, the seal described in that patent is a contacting seal, so that heat generated by frictional contact of the seal faces causes thermal distortions. The seal is designed so that these thermal distortions compensate to a degree the distortions which arise from the high differential pressures across the seal face.

In the context of a non-contacting type seal, commonly assigned U.S. Pat. No. 3,804,424 describes a gas seal having thermal and pressure distortion compensation. The seal relies upon a number of orifices passing through one of the rings to provide an increase in pressure in the seal interface so that the pressure differential does not drop off, the orifices being in communication between the high pressure fluid being sealed at the outer diameter of the seal and a chamber between an inner and outer diameter dam of the primary ring.

SUMMARY OF THE INVENTION

Accordingly, there is provided herein a seal comprising a rotatable shaft capable of rotation within a housing surrounding the rotatable shaft, means for sealing the housing to provide a fluid tight seal for a process fluid under pressure contained within the housing, an axially movable first seal ring adapted to be disposed annularly about the shaft and secured in fluid tight relation to one of the shaft or the housing, the axially movable first seal ring having a seal face section including a radial first seal face, a back section including a back face axially opposite the seal face, and a middle section joining the seal face section to the back section, the seal also comprising a second seal ring adapted to be disposed annularly about the shaft and secured in fluid tight relation to either the shaft or the housing, the second seal ring including a radial second seal face in opposing relationship to the first seal face, the opposing mating portions of the seal faces defining a seal interface, the second seal face including a means for pumping a fluid across the seal interface, the seal further comprising a biasing means for urging the ring seal faces toward each other into a confronting, mating relationship, the middle section having a radial dimension which is in a ratio relative to the radial dimension of the back section of between about 1.5 to about 3.1, more preferably from about 1.9 to about 2.5, and most preferably from about 2.0 to about 2.3, the radial dimension of each section being defined as the difference between the outermost radius and the innermost radius of the respective sections.

DETAILED DESCRIPTION OF THE PREFERRED EMBODIMENTS

The features of this invention can be utilized in either a single or double seal arrangement. For the most part, the other elements of the seal arrangement whether a single or double seals are used, are similar to those elements of a conventional seal as described and claimed in the aforementioned U.S. Pat. Nos. 4,212,475 and 5,375,853, the subject matter of which is hereby incorporated herein. Accordingly, the description of the other seal elements will not be detailed. Only the substantive differences of the seal arrangements and embodiments as described below will be discussed in detail.

Figure 1:
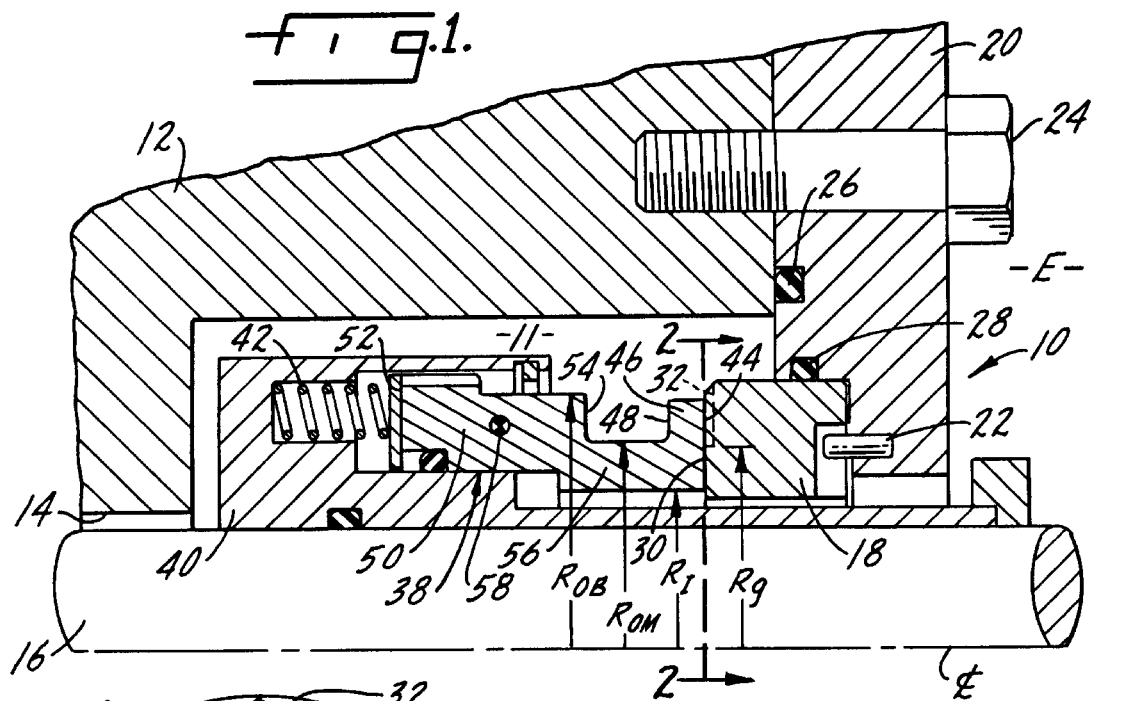
FIG. 1 illustrates a single seal having a primary ring according to the present invention.

Referring now to FIG. 1, an inventive seal embodiment is illustrated in a single seal arrangement 10. The seal arrangement 10, as are all of the embodiments described herein, is intended to seal a fluid at high pressure differentials across the seal in a non-contacting seal arrangement that has some means of pumping a fluid, either a gas or liquid, as shown in the figures, from the outer diameter of the seal rings toward the inner diameter. As described in U.S. Pat. Nos. 4,212,475 and 5,375,853, the means for pumping comprises spiral grooves in the mating ring, but other such means are also available, such as T slots, or grooves not shaped as spirals.

As in most mechanical seals, the seal arrangement 10 is intended to seal a fluid within a chamber 11 defined by a housing 12. The housing 12 has an aperture 14 through which a shaft 16 extends. Because the shaft 16 is intended to rotate relative to the housing 12, a means must be provided to prevent or inhibit leakage of the process fluid in the chamber 11.

The mechanical face seal arrangement 10 includes a mating ring 18 rotationally fixed relative to a gland plate 20 by a pin 22. The gland plate 20 is attached to the housing 12 by a bolt 24 and sealed to the housing by an O-ring 26.

Figure 2:
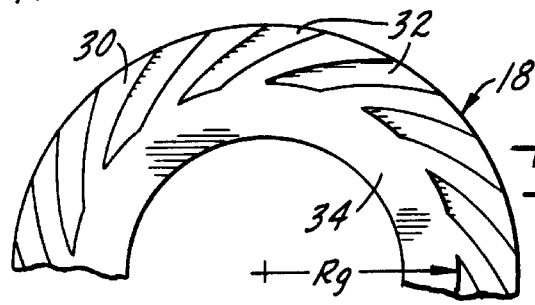
FIG. 2 illustrates a partial cut away view of the primary ring seal face taken along approximately section lines 2—2 of FIG. 1.

A second O-ring 28 seals the seal ring 18 to the gland plate 20 so that no leakage occurs through these connections. Seal ring 18, also referred to as a mating ring, includes a seal face 30. Referring now also to FIG. 2, the seal face 30 includes a plurality of spiral grooves 32, shown in phantom in the seal face 30 of FIG. 1. Grooves 32 extending from edge of seal face 30 pump fluid from the chamber 11 toward the atmosphere or environment E outboard of the seal arrangement 10. The seal ring face 30 also has an ungrooved area, referred to as a dam 34, disposed between the termination point of the grooves 32 and the other edge of the seal face 30. The boundary between the termination of the grooves 32 and the dam 34 is the same for each of the grooves and occurs at a specific radius referred to as $R_g$. The area of each of the seal faces 18 adjacent the opposed seal faces of the other ring is referred to as the seal interface area or simply as the seal interface.

An axially movable primary ring 38 is retained within a sleeve and retainer assembly 40 and is axially biased by a biasing means, such as a plurality of equally spaced apart springs, one spring 42 being shown in FIG. 1. The biasing means biases the primary ring 38 toward the mating ring 18, bringing a seal face 44 of the primary ring toward contact with the seal face 30 of the mating ring 18.

As is recognized in the art, the pumping action of the spiral grooves 32 which ensues upon rotation of the shaft, builds up a fluid pressure between the seal faces to open up a small gap in the interface area between the seal faces.

The point where the grooves 32 terminate, defined as the radial dimension $R_g$, is a significant point in the configuration. The grooves 32 are exposed at one edge of the seal interface to a process fluid under pressure in chamber 11. As the shaft 16 rotates within the aperture 14 in housing 12, the grooves 32 tend to pump the fluid from the chamber 11 into the interface, thereby increasing the fluid pressure between the seal faces 30, 44. The fluid pressure increases as a result of the pumping action until the radius where the grooves terminate, reaching a "pressure peak" at or immediately adjacent the radius $R_g$. Of course, for fluids which comprise a gas, this effect is much more pronounced because a gas is compressible. However, pumping of a liquid process fluid also may result in a pressure increase if care is taken to properly design the shape and depth of the grooves 32.

The build up in pressure in the seal interface and peak at $R_g$ can be described as providing a pressure "spring" force that maintains the gap between faces 30, 44 relatively constant. Should an upset condition result and the pressure be decreased at one point in the seal interface, the seal faces approach each other further compressing the gas at that point. Such pressure compression results in an increase in separation force, leading to an increase in the gap separation. Conversely, if at a point the gap becomes too wide, there is a decrease in compression forces and in pressure, leading to a decrease in separation forces between the seal faces 20, 44, thereby bringing the seal faces closer at that point.

Thus, an equilibrium is reached between the pressure separation forces, tending to maintain a constant gap. Also, as described in U.S. Pat. No. 4,212,475, appropriate ranges in specific seal parameters may be chosen so that the seal provides a self correcting gap separation so as to minimize the seal gap while simultaneously avoiding contact between the seal faces 30, 44.

Figure 3:
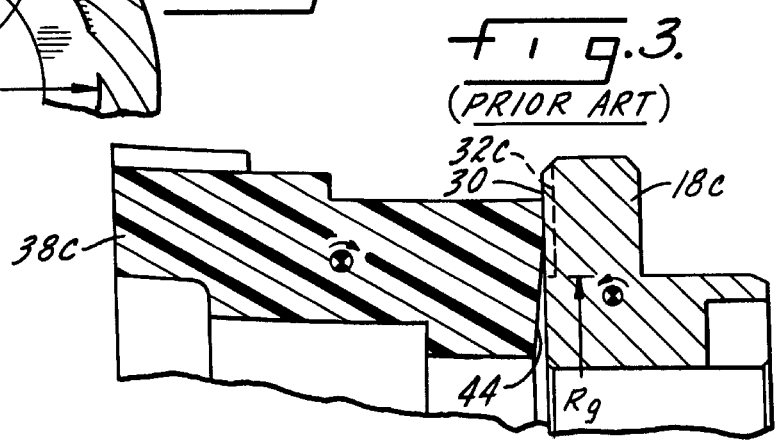
FIG. 3 shows a conventional seal ring pair and a schematically exaggerated "rotation" about the centoid when the seal is under high pressure.

At high pressures, however, the seal rings tend to distort and rotate. For seals that are pressurized at the outer diameter, the rotation occurs from the outer diameters of each seal face inwardly toward the centerline CL of the shaft 16. Referring now to FIG. 3, the rotation (shown by arrows) caused by the process fluid pressure results in the outer diameter edges of the seal faces of a conventional seal ring pair 30, 18C, 38C to approach each other while the seal faces at the inner diameter edges separate. This rotation is greatly exaggerated in FIG. 3, but nevertheless the distortion affects the gap and rendering the seal faces 30, 44 away from a desirable parallel orientation. A gap which is created by seal faces that are not parallel is undesirable because of the increase in the separation between the seal faces 30, 44 at the $R_g$ radius, thereby resulting in a decrease in the separation force provided by the process fluid compression. This results in the gap at the outer diameter to come together, thereby restricting the amount of process fluid available to the spiral grooves 32C for pumping process fluid in to the seal interface area, this further reducing the compression forces available for maintaining the gap separation. Additionally, a decrease in the gap separation at the outer diameter is also undesirable because even minor upset conditions may result in contact between the seal faces at their respective outer diameters, leading to excessive wear and frictional heat which may further distort the seal rings.

Referring again to FIG. 1, the primary seal ring 38 includes features which provide seal characteristics calculated to compensate for and overcome the seal ring distortions caused by high pressures, and thereby maintaining parallelity between the seal ring faces. For purposes of this description, the primary seal ring is defined as comprising three sections, a first or seal face section 46 which includes the seal face 44 and an axial portion of the primary ring 38 approximately projecting to a radially extending surface 48. A second or back section 50 includes that portion of the primary ring 38 axially removed from the seal face, from the back face 52 approximately to a radially extending surface 54.

The third or middle section 56 includes that portion of the primary ring 38 which joins the seal face section 46 to the back section 50. The middle section 56 is further defined by an axial length between the radially extending surfaces 48 and 54 which has in at least one portion an outer diameter or radius that is significantly less than the outer diameter of the back section 50 or of both the back section 50 and of the seal face section 46.

Figure 4:
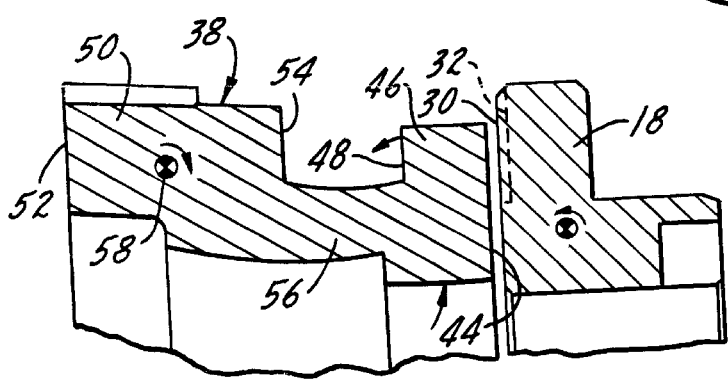
FIG. 4 schematically illustrates a seal ring pair having a primary ring according to the present showing in exaggerated not to scale distortion of the seal rings.

Referring now to FIGS. 1 and 4, this configuration of the primary ring 38 provides characteristics that enable the seal face 44 to alter its radial orientation to compensate for the distortion of the corresponding mating ring 18. Ideally, the middle section 56 has a radial dimension, that is, the difference between the outer diameter and inner diameter of the middle section 56 which is significantly smaller than the corresponding radial dimension of the back section 50 and also of the seal face section 46.

The primary ring configuration provides a greater flexibility which makes the ring much more compliant and responsive to the process pressure. The thinner radial dimension of the middle section 56 provides a greater flexibility to the seal ring such that any distortion of the seal ring causing a rotation of the back portion 50 around a "centroid" 58 does not cause the seal face portion 46 to also rotate around the centroid. It is thought that the middle section 56 undergoes additional distortion causing the middle section 56 and face section 46 to be displaced in the respective directions of the arrows indicated in FIG. 4, to cause the seal faces 44 and 30 to again come into an essentially parallel orientation. This additional distortion results from the pressure buildup in the seal interface caused by the pumping action of the grooves 32 acting on the seal face 44 opposite from the radially extending surface 48, wherein a pressure force is exerted axially on the face section 46.

Figure 5:
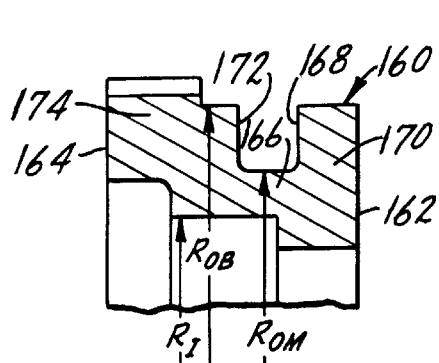
FIG. 5 illustrates another embodiment of a primary ring according to the present invention.
Figure 6:
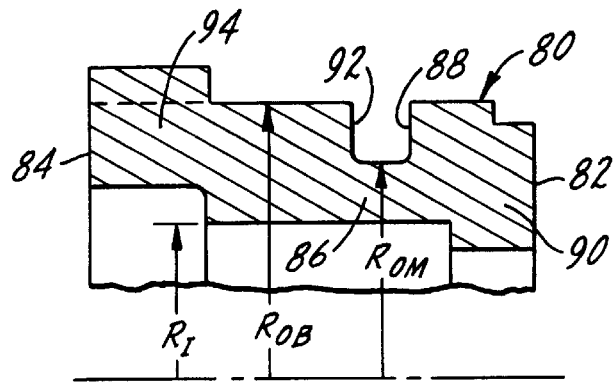
FIG. 6 illustrates yet another embodiment of a primary ring according to the present invention.

The angle of both the mating and primary ring seal faces distort with increasing process fluid pressure. Moreover, the seal face deflection in each seal ring occurs simultaneously to permit the faces to retain a desired relative angle over a much greater range of pressures, and especially in the upper pressure range of from 300 p.s.i to 600 p.s.i. Referring now to FIGS. 5 and 6, therein are illustrated alternate embodiments or primary rings utilizing the features of the present invention. Primary ring 60 shown in FIG. 5 has a much shorter axial length dimension as measured from the seal face 62 to the back face 64. In this particular embodiment, that translates into a shorter corresponding middle section 66, defined by the radially extending back wall 68 of the seal face section 70, and the radially extending wall 72 of the back section 74.

Conversely, primary ring 80 of the embodiment shown in FIG. 6 has a much longer axial dimension from the primary ring 60 (FIG. 5). The relative axial dimensions of the primary rings may depend on the particular application or on the space available in the chamber 11.

The primary seal ring further includes a middle section 86, which is much smaller axially relative to the axial length of the ring 80 than is the case for ring 60. The radially extending wall 88 defining the front section 90 and the radially extending wall 92 defining the back section 94 are much closer to each other relative to the axial dimension between the face 82 and the back face 84. However, the actual distance in each primary ring embodiment 60, 80 may be identical as measured between walls 68, 72 and 88, 92.

Figure 7:
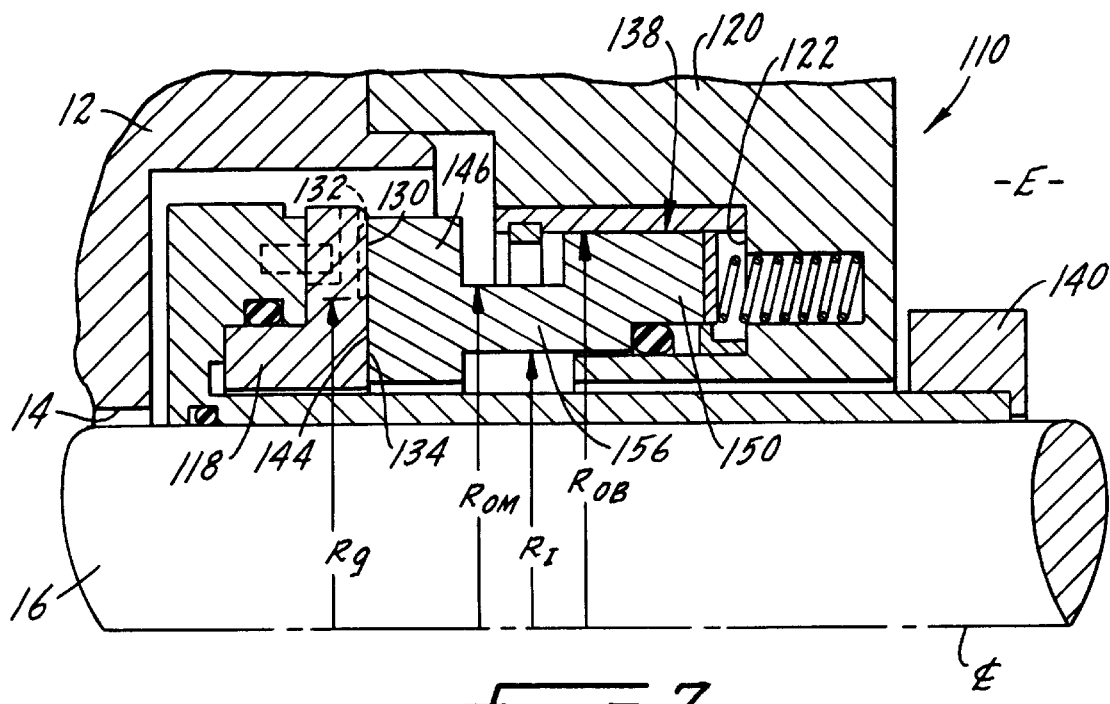
FIG. 7 illustrates yet another embodiment of the seal according to the present invention.
Figure 8:
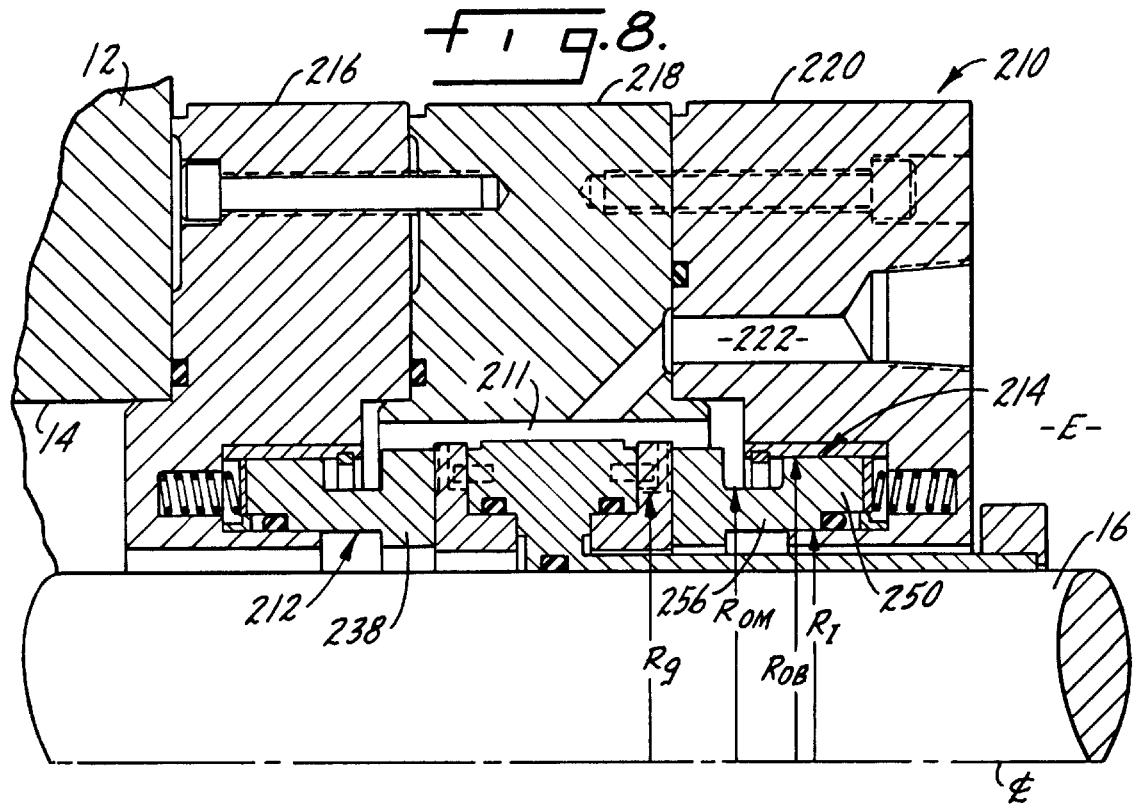
FIG. 8 illustrates a dual non-contacting mechanical seal arrangement in which the primary seal rigs of each seal incorporated features according to the present invention.
Figure 9:
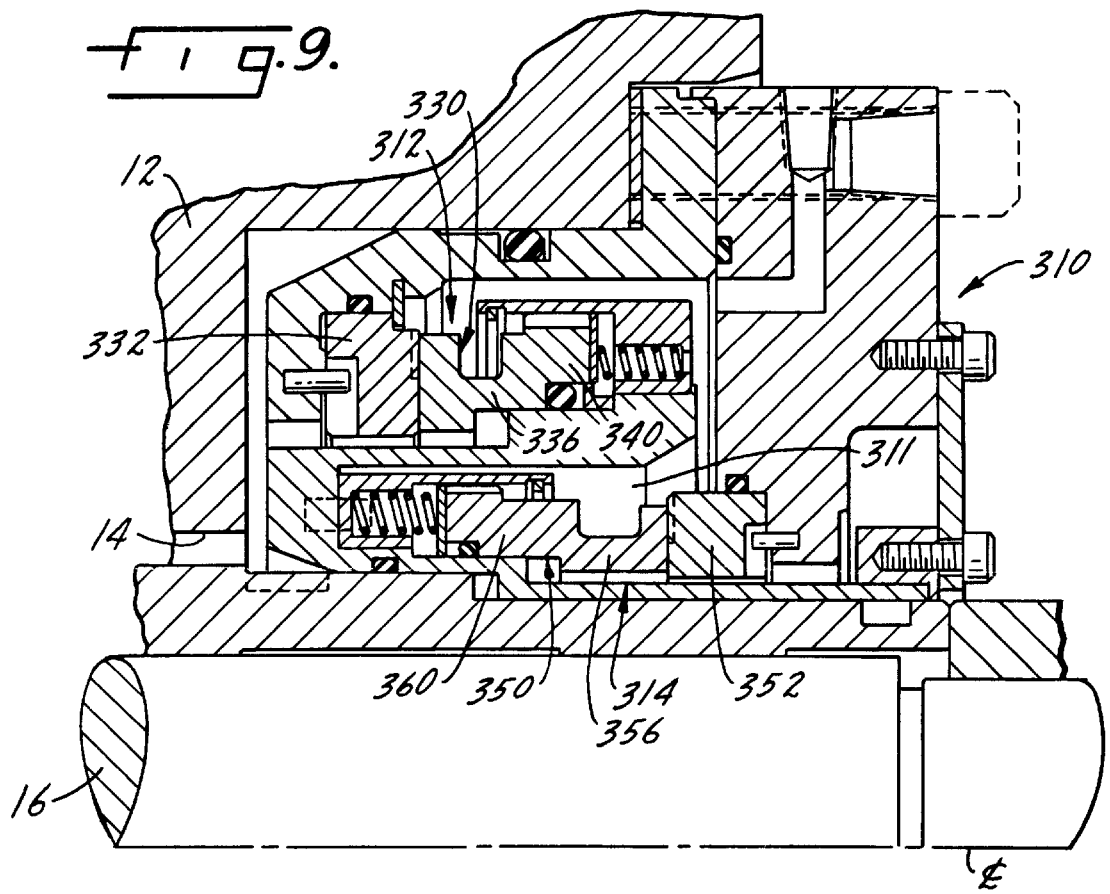
FIG. 9 illustrates a dual non-contacting mechanical seal including primary rings according to the present environment in an over-under arrangement.

The important feature of the invention that is contained in each embodiment of the primary ring, whether primary ring 38, 60, 80 or any of the primary ring configurations described below with regard to FIGS. 7 through 9, is the relative radial dimensions, which may be considered the radial thickness, of the middle sections 56, 66, and 86 as compared to the other sections. More specifically, if the radial thickness of the primary ring is defined as the outer radius $R_O$ less the inner radius $R_I$ then the ratio of the radial thicknesses of the back sections 56, 66, 86 as defined by the equation $$\frac{R_{OB} - R_i}{R_{OM} - R_i}$$

is in a range of from 1.5 to 3.1, preferably from 1.9 to 2.5, and most preferably from 2.3 to 2.5, depending on the particular application. Recent testing, performed after the filing of the parent application, has developed that the expanded range of the radial dimension is suitable for some sealing applications, and will provide the ability to seal at higher pressures more effectively.

For example, primary ring 160 (FIG. 5) has specific radii for each of the annular surfaces defining the back section 174, the middle section 166 and the seal face section 170, as shown. The radial dimension (thickness) of the back section 174 is approximately 0.877 inches while for the middle section 166 it is approximately 0.290 inches, providing a ratio of approximately 3.02. The primary seal ring 160 is close to the higher periphery of the range of ratios, and in fact slightly exceeds it. That is a consequence of the short axial dimension of the primary ring 160, in that additional flexibility is required to distort the middle section 166 to provide the correct orientation of the seal face section 170 and more particularly, of the seal face 167. This arrangement is suited for applications having higher differential pressures.

There is an optimum range of ratios which should be considered in designing the primary ring to provide the desired characteristics of seal ring integrity and flexibility to accommodate extreme pressure differentials. If the middle section is made too thick relative to the back section, then only a minimal degree of flexibility in the middle section will make the primary ring insufficiently responsive to the pressure differential, which will distort the corresponding mating ring, but not the primary ring. Testing of seals arrangements at higher pressures has proved effective compliance of the primary ring in an optimum range beyond that set forth in the parent U.S. Pat. No. 5,681,047. Conversely, if the middle section is made too thin, that is, with at ratio greater that 3.1, the result is a loss of structural support between the back section and the seal face section and a resultant increase in the tensile stress occurring on the middle section. Insufficient thickness in the middle section may result in the fracture of the ring at the middle section because of excessive tensile strength, especially in seal applications in which the process fluid pressure undergoes extensive fluctuation e.g., such as when the device, whether pump, compressor, etc. in which the seal is installed, cycles through periods of use and non-use. In such a case, the continual flexing of the middle section of a primary ring may impact negatively on the integrity of the primary seal ring until a fracture develops. Flexibility in the primary ring can also be provided in choosing an appropriate material for the manufacture thereof. The conventional through in design and manufacture of high pressure seals was that tough and sturdy materials were necessary. The standard materials used in the mating ring of configurations of non-contacting seals is generally tungsten carbide. Using conventional primary seal rings such as the one illustrated in FIG. 3, also required a hard material, such as silicon carbide, which could withstand the high pressures of the process fluid, and could also resist excessive wear of the seals faces during contact, which normally occurs when the shaft rotation commences or when the device is being shut down. During such periods, the seal rings do not rotate relative to each other so as to provide sufficient pumping action of the grooves to maintain lift-off of the seal faces. However, use of two "hard" rings, such as tungsten carbide against silicon carbide, may lead to catastrophic failure of the seal rings if contact occurs at the high rational speeds during normal operation.

The flexibility feature provided by use of the inventive construction described herein also permits use of standard carbon graphite primary rings, which is the primary ring material generally used for conventional seals, that is, for seals not intended for use at excessively high pressures. Because the primary ring can accommodate the excessive pressures and still for the most part avoid seal face contact at high rotational speeds, it is an added feature that the inventive primary ring construction permits use of carbon graphite material. Use of carbon graphite is also preferable if it can be made to withstand high pressure differentials, since it is more forgiving in the event of seal face contact between the seal rings at high rotational speeds. Instead of fracture and disintegration of the seal ring which may occur with a silicon carbide primary ring, the carbon graphite ring simply rubs away some of the carbon, but maintains its integrity.

Referring now to FIG. 7, another aspect of this invention is described. A single seal arrangement 110 is shown for sealing a housing 12 having an aperture 14 through which a shaft 16 extends so that process fluid leakage is minimized. Most of the elements of the seal arrangement 110 are similar or identical to that of seal arrangement 10 (FIG. 1) except that there is a transposition of those parts which are rotating and those which are stationary. Such transposition of seal rings is known by those skilled in the art, and may be appropriate depending on the seal application.

For example, seal arrangement 110 includes a rotating mating ring 118 and a relatively stationary primary ring 138. The gland plate 120 has appropriate apertures 122, which retain the primary ring 138 and the springs which provide an axial biasing forces to the primary ring 138 to tend toward contact and bias of the seal face 144 of the primary ring against the opposed mating seal face 130 of the mating ring 118. In this configuration, it is the mating ring 118 which is supported by and sealed to a sleeve/retainer combination 140, with which it rotates together with the shaft 16.

One difference in the construction of the primary ring 138 is evident in the radial dimension of the seal face section 156. The preferred application for seals having large seal face areas is for seals which are subjected to high fluid pressures, but relatively slows rotational speeds are not excessive, the amount of wear of the seal faces is reduced, but more significantly, a greater seal interface area between the opposing mating seal faces 130, 144 is necessary in order to build up the pressure sufficient to provide lift-off and to maintain the gap.

However, despite the enlarged seal face area, the relationship of the primary ring radial dimensions of the back section 150 to that of the middle section 156 is maintained. As calculated for the primary seal ring 138, that ratio is approximately 1.9, close to the periphery of the optimal range of "thickness" ratios identified above. The larger relative thickness of the middle section 156 can be utilized because with a larger radius of the seal face portion 146, the pressure developed in the seal interface has a longer "lever" to act on, thereby enabling the pressure force to distort a relatively thicker middle section 156.

The other material feature which is illustrated by FIG. 7 is the pressure which is developed by the grooves 132 of the corresponding mating ring 118. As is generally recognized by those having skill in the seal art, the grooves 132 having a similar configuration as that shown in FIG. 2, will provide an increasing pressure as the gas is pumped from the outer diameter toward the dam 134 of the seal face 130. The peak in pressure is considered to be at or close to the boundary between the groove termination and the dam, and then to decline from the peak to attain the environmental pressure of the space E just outboard of the seal arrangement 110. The environment E may be at atmospheric pressure or at some other pressure if a dual seal arrangement is used, as will be described below.

The boundary between the grooves and the dam 134 is shown in FIG. 7 as being at a radius $R_g$. It has been found that it is desirable to have a relatively fixed relationship between the outer diameter of the middle section 156 and the boundary radius $R_g$. For all of the seals made according to this invention that relationship is that the middle section radius $R_{OM}$ should be approximately equal to $R_g$. The radius $R_g$ may be relatively slightly more or less than the radius $R_{OM}$, to within 10% of the thickness of the seal interface, i.e., ten percent of the outer diameter more or less than the inner diameter of the seal interface. Preferably, and as shown in most embodiments described herein, $R_g$ is slightly less than $R_{OM}$, which translates the greatest amount of axial force on the outer diameter portion of each seal face section 46, 70, 90, 146, etc. The pressure force applied at or around the $R_g$ radius is most desirable in providing the axial force to the primary ring such as to favorably distort the respective middle sections, thereby tending toward parallelity of the seal faces.

Referring now to FIGS. 8 and 9, two dual seal arrangements are illustrated for seals such as those described in aforementioned U.S. Pat. No. 5,375,853. In such configuration, two seals define an intermediate chamber between them, which intermediate chamber is in fluid communication with a source of a buffer gas under pressure. In U.S. Pat. No. 5,375,853, the buffer gas is maintained at a pressure higher than the expected pressure of the process fluid during operation, but this is not a general requirement for utilizing the features of this invention. The features of this invention are of course best suited for an arrangement in which high pressure differentials develop across on or both of the seals of a dual seal arrangement.

Referring now to FIG. 8, a dual seal arrangement 210 is disclosed having a first inboard seal 212 and a second outboard seal 214 axially spaced apart along a shaft 16 which extends through an aperture 14 in a housing 12. The housing 12 encloses a chamber 11, part of which is visible in FIG. 8, which contains a process fluid under pressure. For the most part, seal arrangement 210 is similar to the seal arrangement described in U.S. Pat. No. 5,375,853 except that the mating rings of each seal 212, 214 are rotating and the primary rings are retained rationally stationary by a series of glands 216, 218, 220, which are attached to each other and to the housing by bolts, as shown. A passageway 222 through glands 218 and 220 provides communication to a source of pressurized inert buffer gas, such as nitrogen, which is contained under pressure within the intermediate chamber 211 defined by the seals 212, 214.

The broad outline of such an arrangement of generally described in the text of U.S. Pat. No. 5,375,853 as being within the purview of a person in the art, except that no disclosures of the features of the present invention can be found in that patent. For these reasons, the other elements, such as, secondary seal O-rings, biasing springs, etc. will not be discussed herein in detail.

Primary ring 238 of inboard seal 212 and primary seal ring 250 of outboard seal 214 may be identical to each other except for their axial orientation, despite the pressure differentials across seal 212 being much less than the pressure differential across seal 214. The buffer gas in the intermediate seal chamber 211 is maintained at about 20–30 psi above the maximum expected pressure of the process. However, the pressure of the process fluid may be higher than that expected for the application intended seal arrangements in accordance with U.S. Pat. No. 5,375,853. In such a case, the buffer gas pressure may be in excess of the rating for such seal arrangements, in which case modification in accordance with the teaching herein of at least the primary ring 250 of outboard seal 214 is required.

As described above, the outer diameter of the middle section 256 of at least the primary ring 250 should contain the features of this invention, to enable the seal faces to maintain parallelity despite large pressure differentials. The relative radial dimensions of $R_g$ and $R_{OM}$ are also maintained as shown in FIG. 8.

The dual seal embodiment of FIG. 8 also illustrates the adaptability of the primary ring 238 to various pressure situations, and for adjusting the seal face orientation due to seal ring distortion through great fluctuations in process or buffer gas pressure. Since the amount of distortion of both primary and mating rings depend on the pressure differentials across the seal interface, any sudden fluctuations in either process or buffer fluid pressure would affect both seal rings simultaneously, and thereby the parallel orientation of the seal faces is maintained despite such fluctuations. By virtue of this adjustable orientation, if the pressure differential is very small, such as that across the inboard seal 212, no distortion of the seal rings occurs, in which case the seal faces are parallel by virtue of their conventional manufacturing.

Referring now to FIG. 9, a dual seal arrangement 310 is illustrated for use in which there is small axial room in chamber 311 for insertion of axially spaced seals. In seal arrangement 310, the inboard seal 312 is disposed radially outwardly of the outboard seal 314 with an intermediate chamber 311 in the radial space between them. Such an arrangement may require that the seal rings 330 and 332 of at least seal 312 have a lesser axial dimension than the seal rings 350, 352 of the seal 314, as shown. A primary ring similar to the primary ring 60 shown in FIG. 5 thus may be utilized in the seal 312 to reduce the axial extent of the seal. Again, both seals 312 and 314 include primary rings 330, 350, utilizing the features of this invention, including the primary rings 330, 350 having ratio of radial dimensions of the back sections 340, 360 to that of the middle sections 336, 356 of between 1.5 and 3.1, as described above. The radius $R_g$ of each mating ring 332, 352 also is shown slightly smaller than the corresponding outer radius $R_{OM}$ of the middle section, but this is not a requirement, $R_g$ since may be slightly larger than $R_{OM}$.

Other modifications and alterations of the seal parameters may be made to the primary seal rings and still be encompassed by the scope of the present invention. For example, the walls 68, 72, 88, 92, etc. are shown as extending radially outwardly from the centerline. However, the walls need not extend radially, but may extend at converging angles relative to a transverse radial plane. Similarly, the outer diameters of each of the middle sections are shown uniformly at the same radius, but this also is not a requirement. The outer radius of the middle section may be concave or angled relative to the centerline CL, to more precisely locate the distortion of the primary ring or to adjust the location where the distortion occurs.

This invention is also usable with a pressurized seal in which the high pressure comes into contact with the inner diameter of the seal rings. Such a modification may require that the pumping grooves be exposed at their inner diameter to the fluid in the respective chamber, but the decrease in radial dimension of the primary ring middle section may be made either at the inner diameter of the ring or at the outer diameter, depending on the particular application. Alternatively, the inventive features may be utilized with a seal arrangement in which the grooves are exposed to the lower pressure fluid, as in seals made in accordance with commonly owned U.S. Pat. No. 4,290,611, in which the pumping grooves are exposed to the lower pressure of either the process or buffer fluid, with the understanding that appropriate other modifications may be necessary.

Other alterations and modifications may also become obvious to a person of ordinary skill in the art after a full understanding of the present invention is attained. For these reasons the above embodiments should be considered as examples only, and not as limiting the scope of this invention. The scope of the invention should only be considered limited by the following claims.

What is claimed is:

1. A seal comprising a rotatable shaft capable of rotation within a housing surrounding said rotatable shaft, means for sealing said housing to provide a fluid tight seal for a process fluid under pressure contained within said housing, an axially movable first seal ring adapted to be disposed annularly about said shaft and secured in fluid tight relation to one of said shaft or said housing, said axially movable first seal ring having a seal face section including a radial first seal face, a back section including a back face axially opposite said seal face, and a middle section joining said seal face section to said back section, said seal further comprising a second seal ring adapted to be disposed annularly about said shaft and secured in fluid tight relation to the other of said shaft or said housing, said second seal ring including a radial second seal face in opposing relationship to said first seal face, said opposing mating portions of said seal faces defining a seal interface, said second seal face including a means for pumping a fluid across the seal interface, said seal further comprising a biasing means for urging said ring seal faces toward each other into a confronting, mating relationship, said middle section having a radial dimension which is in a ratio relative to said radial dimension of said back section of between about 1.5 to about 3.1, the radial dimension of each section being defined as the difference between the outermost radius and the innermost radius of said respective sections.

2. The seal according to claim 1 wherein said ratio of the back section radial dimension to said middle section radial dimension is between about 1.9 to about 2.5.

3. The seal according to claim 1 wherein said ratio of the back section radial dimension to said middle section radial dimension is between about 2.0 to about 2.3.

4. The seal according to claim 1 wherein said means for pumping a fluid across the seal interface in said second seal face further comprises spiral grooves that terminate at a dam portion of said second seal face, said dam portion and said grooves defining a boundary disposed at a radius $R_g$, $R_g$ having a radial dimension being approximately equal to the outer radial extent of said middle section.

5. The seal according to claim 1 wherein said means for pumping a fluid across the seal interface in said second seal face further comprises spiral grooves that terminate at a dam portion of said second seal face, said dam portion and said grooves defining a boundary disposed at a radius $R_g$, $R_g$ having a radial dimension slightly smaller than the outer radial extent of said middle section.

6. The seal according to claim 1 wherein said means for pumping a fluid across the seal interface in said second seal face further comprises spiral grooves that terminate at a dam portion of said second seal face, said dam portion and said grooves defining a boundary disposed at a radius $R_g$, $R_g$ having a radial dimension slightly larger than the outer radial extent of said middle section.

* * * * *